United States Patent [19]

Stedman

[11] 3,917,362

[45] Nov. 4, 1975

[54] LUBRICATED TRACK ROLLER

[75] Inventor: Robert N. Stedman, Chillicothe, Ill.

[73] Assignee: Caterpillar Tractor Co., Peoria, Ill.

[22] Filed: Dec. 17, 1973

[21] Appl. No.: 424,922

[52] U.S. Cl.............. 308/20; 184/105 R; 308/103; 308/109

[51] Int. Cl.².................. F01M 11/04; F16C 13/00; F16C 33/74; F16C 35/02

[58] Field of Search............. 85/1 JP, 8.8; 184/6.26, 184/105 R; 308/20, 103, 109

[56] References Cited
UNITED STATES PATENTS

| | | | |
|---|---|---|---|
| 240,812 | 5/1881 | Coleman | 308/109 X |
| 492,917 | 3/1893 | Gouland | 308/103 X |
| 2,237,921 | 4/1941 | Baker et al. | 308/103 |
| 2,349,898 | 5/1944 | Beckman | 308/103 |
| 2,723,168 | 11/1955 | Carroll | 308/109 |
| 2,752,814 | 7/1956 | Iaia | 85/1 JP |
| 3,515,446 | 6/1970 | Maguire | 308/20 |
| 3,744,860 | 7/1973 | Casey | 308/109 |
| 3,770,036 | 11/1973 | Sherman | 85/8.8 X |

Primary Examiner—M. Henson Wood, Jr.
Assistant Examiner—Howard Beltran
Attorney, Agent, or Firm—Phillips, Moore, Weissenberger, Lempio & Strabala

[57] ABSTRACT

Lubricating means are provided for lubricating track rollers for track-type vehicles including conventional support bushing bolt holes modified to communicate with existing lubricant reservoirs via radial passages formed between the bolt holes and the reservoirs. Removal of one of the bolts from the modified bolt hole and loosening of another such bolt permits filling and venting of the corresponding reservoir for replenishing lubricant as necessary, either in the factory or field.

6 Claims, 1 Drawing Figure

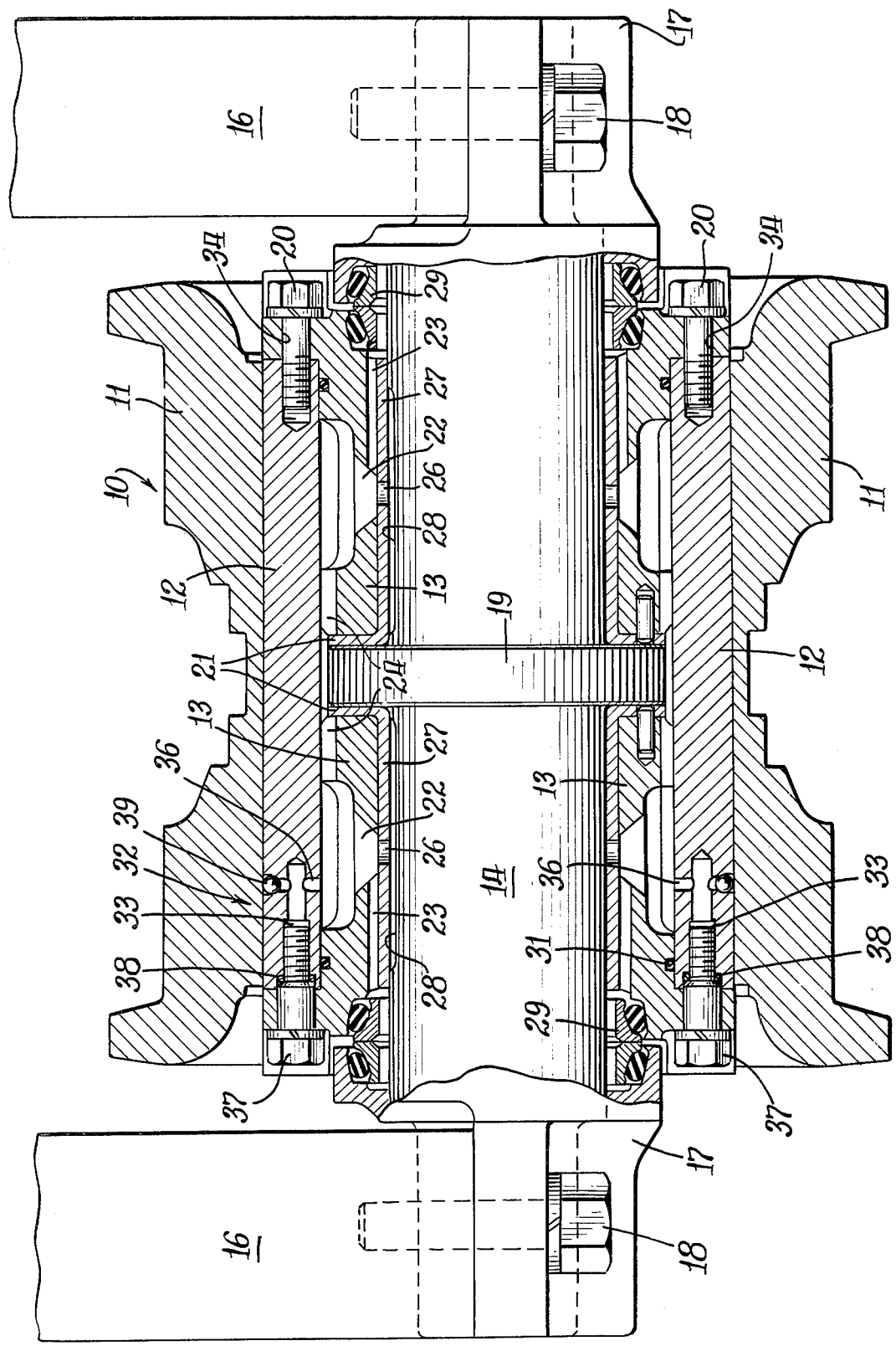

LUBRICATED TRACK ROLLER

BACKGROUND OF THE INVENTION

This invention relates to lubricating means for lubricating track rollers of track-type vehicles. More particularly, the invention relates to lubricating means for these rollers which are uncomplicated and economical in that the necessity for costly boring of the roller shaft is eliminated.

To obtain a desirably protracted wear-life of track-type vehicles lubricating means must be provided for the track rollers thereof. In particular, the high operating speeds of some track-type, heavy-duty earthworking equipment and the concomitantly high rotative speeds of their track rollers under heavy loading make it imperative that highly effective lubricating means for lubricating the bushing members supporting these rollers be provided to prevent premature wear and failure of the rollers.

Owing primarily to the relative inaccessability of the bearing surfaces of such bushing members, a straightforward solution to the problem of lubricating roller components has not been readily apparent.

Numerous lubricating means have been proposed for lubricating track rollers. Typically, lubricating means for track rollers having centrally mounted thrust bearings have required extensive costly machining of the roller shaft to provide a chamber or similar reservoir for storing lubricating fluid therein. Additionally machining of the shaft is normally required to provide a central passageway and radially correlated passages leading to areas requiring lubrication for distribution of the lubricating fluid and for venting the remote chambers. Such means are examplified in U.S. Pat. No. 3,515,446 to Maguire, of common assignment herewith, and No. 2,349,898 to Beckman.

Other means have been proposed for providing lubricating chambers, for example, the hollow extruded one-piece roller shaft described in U.S. Application Ser. No. 421,120, entitled "Formed One-Piece Hollow Roller Shaft," by Lawrence Gibble et al. on Oct. 3, 1973, of common assignment herewith, but these, too, are frequently prohibitively costly. Also, the presence of voids or passages, in the roller shaft tends to reduce the structural integrity thereof and often results in an undesirably short shaft wear life.

The problem of lubricating track rollers of the type having centrally mounted thrust bearings has been reduced somewhat with the increasing use of track rollers having end-mounted thrust bearings and radial support bearings which are easily serviced, such as that described in U.S. Pat. No. 3,744,860 to Casey, of common assignment herewith. However, this type of track roller is not yet in extensive use, and it remains desirable to provide inexpensive lubricating means for lubricating track rollers of the more conventional type having centrally disposed thrust bearings.

SUMMARY AND OBJECTS OF THE INVENTION

This invention provides inexpensive lubricating means for lubricating track rollers having centrally disposed thrust bearings. The lubricating means include a plurality of conventional support bushing bolt holes modified to intersect a plurality of radial passages communicating with existing internal bushing lubricating reservoirs. Removal of one of the mating bolts from the support bushing bolt holes, and loosening of another such bolt permits ready introduction of lubricating fluid through the open bolt hole to the lubricating reservoir via the corresponding radial port, and further permits ready venting of the lubricating reservoir. The reservoirs may thus be filled and replenished as necessary in the factory, or field, to insure a constant and adequate supply of lubricant to the track roller without costly machining of the track roller shaft.

It is an object of this invention to provide simple and economical lubricating means for a track roller of the type having centrally disposed thrust bearings.

It is another object of this invention to provide lubricating means for a track roller of the type having centrally disposed thrust bearings which means obviate the necessity for costly machining of the track roller shaft.

It is a further object of this invention to provide lubricating means for a track roller of the type having centrally disposed thrust bearings which means do not tend to substantially reduce the structural integrity of the track roller shaft.

Another object of this invention is to provide track roller lubricating means of the type described wherein the bolts for lubricating servicing are readily accessible.

Other objects and advantages of the invention will become apparent from the following description and drawings.

BRIEF DESCRIPTION OF THE DRAWING

The sole FIGURE is a cross-sectional elevation of a track-roller embodying the lubricating means of this invention.

DETAILED DESCRIPTION

A track roller of the type having centrally disposed thrust bearings is generally indicated at 10, and includes a pair of track-engaging axially spaced rims 11 press-fitted upon a cylindrical hub 12. The track roller 10 is rotatably supported by a pair of bushings 13 coaxially disposed about a roller shaft 14. The shaft is rigidly fixed at its ends to a pair of rails 16 which form a roller frame with a pair of brackets 17 secured to the rails 16 by bolts 18. As is well-known in the art, such frames afford rigid support for a plurality of such track rollers, which are normally employed in conjunction with a pair of complementing endless articulated track chains used to support, motivate and steer track-type vehicles such as crawler-type vehicles.

The bushings 13 are conventionally supported within the roller 10 by means of a plurality of bolts 20 securing the bushings to the hub 12.

The shaft 14 includes a centrally disposed flange 19 which rotatably abuts annular bearings 21 integrally formed with the bushings 13 to maintain the roller 10 in an axially fixed position for accommodating high side loads during steering and side hill operations. Lubricating fluid is conventionally provided to the bushings 13 from lubricating fluid reservoirs such as cavities 22 containing high viscosity lubricating oil. The lubricating fluid is distributed from the cavities 22 throughout the bearing surfaces via axial passages 23 and axial grooves 24 disposed respectively on the inner diameter and outer diameter of the bushings 13, and via a plurality of radial ports 26 in the bushing liners 27 communicating between the cavities 22 and a pair of axially elongated flats 28 on the surface of the shaft 14. Lubricating fluid is also distributed axially outwardly from the cavities 22 via the passages 23 to lubricate and cool sealing means for preventing leakage of lubricating fluid past the roller 10, such as a pair of face-type seals 29. Additional sealing means such as O-rings 31 are provided to prevent leakage of lubricating fluid past the mating surfaces of the hub 12 and bushings 13.

The track roller 10 as described thus far essentially represents a conventional track roller of the type having centrally disposed thrust bearings, including conventional lubricating means commonly employed with such track rollers. Similar track rollers having equivalent lubricating means are suitable for use in conjunction with the lubricating means of this invention now to be described in detail.

The lubricating means of this invention is generally indicated at 32. It includes a plurality of elongated bolt holes 33 which are modifications of conventional bolt holes 34 accommodating the conventional bolts 20. The lubricating means 32 further includes radial passages 36 communicating between the elongated bolt holes 33 and the cavities 22. The elongated bolt holes 33 accommodate a plurality of modified bolts 37 which comprise conventional bolts 20 adapted for sealing the elongated bolt holes 33 against lubricant leakage. The modified bolts 37 preferably comprise shoulder bolts as illustrated, which are provided with O-rings 38 to seal the bolts against leakage. The elongated bolt holes 33 are counterbored to accommodate the bolts 37 to insure a snug fit.

Preferably, the radial passages 36 are formed by drilling through the hub 12 to intersect the elongated bolt holes 33 toward the bottom portion thereof. The opening of these passages in the outer diameter of the hub 12 is then sealed as by a plug 39 or other appropriate means.

Although the specific number of lubricating means 32 employed in conjunction with the roller 10 may vary, at least two must be provided to obtain the proper venting. Advantageously, the roller 10 is equipped with two diametrically opposed lubricating means 32 on one end of the roller 10. In some cases, however, it may be desirable to provide additional lubricating means 32 at the same end of the roller 10, or alternately, at the opposite end of the roller to insure more rapid and positive venting and filling of the roller. Also, additional lubricating means 32 may be employed on both the same end and opposite end of the roller 10, if desired.

The lubricating means 32 may be readily adapted to various roller constructions by appropriate location of equivalent radial passages 36. For example, the lubricating means 32 are adaptable to single or two-piece hubless rollers by the provision of suitable alternate radial passages 36.

In practice, lubricant is initially supplied to the cavities 22 through the elongated bolt holes 33 after removal of the modified bolts 37, which are preferably marked for ready identification in both the factory and field. Advantageously, a special lubricating gun designed for this purpose is employed. Normally, owing to the high quality of the face-type seals 29, the initial fill of the lubricant to the cavities 22 will suffice for the lifetime of the roller 10. However, if some leakage should occur, and it is desired to replenish the cavities 22, one of the modified bolts 37 is removed, and a diagonally opposing modified bolt 37 is loosened. Sufficient clearance is available between the ends of the bushings 13 and the inner walls of the rails 16 to allow application and use of wrenches on the bolts 37. However, it is preferable to horizontally align these bolts beneath the lower edge of the rails 16 so that there is ready access to these bolts and the corresponding bolt holes. A lube gun is inserted and coupled in the empty elongated bolt hole 33 and lubricant is forced through this bolt and the corresponding radial passage 36 to the corresponding cavity 22. Such procedure is continued until there is an indication of adequate filling by the presence of a solid stream of lubricant from the opposing elongated bolt hole 33 where the modified bolt 37 has been loosened. In the event the subject bolts 37 have been horizontally aligned prior to filling, as described above, gravity insures filling of the lower half of the roller 10, and much of the upper half of the roller would be vented and filled due to the interconnecting internal passages.

In view of the foregoing, it should be apparent that the lubricating means 32 of the present invention permits ready filling and replenishing of the cavities 22 as well as venting thereof, during factory or field servicing. The lubricating means not only retain the field service capability of other rollers, but make possible substantial savings in the manufacture costs, while eliminating potential stress risers in critical areas of the shaft concomitant to machining thereof which have occasionally resulted in premature failure.

While the invention has been described with particular reference to the preferred embodiment, it is apparent that variations and modifications are possible within the purview of the inventive concepts. No limitation with respect to such variations and modifications is intended, except by the scope of the appended claims.

I claim:

1. A roller having hollow cylindrical hub means for mounting rim means thereupon, bearing means mounted within said hollow hub means and affixed thereto for rotatably supporting said hub means upon a shaft, said bearing means including cavity means for containing lubricating medium, said bearing means being affixed to said hub means by means of a plurality of bolts received within a corresponding plurality of bores in said hub means, at least one of said bores communicating with said cavity means for transmitting said lubricating medium to and from said cavity means through said at least one bore, said at least one bore including a counterbored portion and a reduced diameter portion, said reduced diameter portion extending longitudinally along said hub means to a point laterally aligned with said cavity means, and wherein a radial port is provided in said hub means for intersecting said reduced diameter portion and for communicating said portion with said cavity means, said radial port completely transpierces said hub means and wherein one end of said radial port is closed by means of a plug.

2. A roller having hollow cylindrical hub means for mounting rim means thereupon, bearing means mounted within said hollow hub means and affixed thereto for rotatably supporting said hub means upon a shaft, said bearing means including cavity means for containing lubricating medium, said bearing means being affixed to said hub means by means of a plurality of bolts received with a corresponding plurality of bores in said hub means, at least one of said bores communicating with said cavity means for transmitting said lubricating medium to and from said cavity means through said at least one bore, said at least one bore including a counterbored portion and a reduced diameter portion, separate passage means intermediate said reduced diameter portion and said cavity means and communicating between said reduced diameter portion and said cavity means, at least one of said bolts to be received within said at least one bore has a shoulder portion between an enlarged shank portion thereof and a reduced diameter threaded shank portion thereof, said counterbored portion receiving said enlarged shank portion and said reduced diameter portion receiving said threaded shank portion.

3. The invention of claim 2 wherein seal means are provided within said at least one bore for sealing engagement with said at least one bolt for selectively preventing the flow of lubricating medium from said cavity means.

4. The invention of claim 3 wherein said bearing means include first and second axially spaced bushings.

5. A roller having hollow cylindrical hub means for mounting rim means thereupon, bearing means mounted within said hollow hub means and affixed thereto for rotatably supporting said hub means upon a shaft, said bearing means including cavity means for containing lubricating medium, said bearing means being affixed to said hub means by means of a plurality of bolts received within a corresponding plurality of bores in said hub means, at least one of said bores communicating with said cavity means for transmitting said lubricating medium to and from said cavity means through said at least one bore, said at least one bore including a counterbored portion and a reduced diameter portion, said reduced diameter portion extending longitudinally along said hub means to a point laterally aligned with said cavity means, and wherein a radial port is provided in said hub means intermediate said reduced diameter portion and said cavity means for communicating said portion with said cavity means.

6. The invention of claim 5 wherein there are two said bolt receiving bores which communicate with said cavity means.

* * * * *